(12) United States Patent
Takimoto et al.

(10) Patent No.: US 11,215,374 B2
(45) Date of Patent: Jan. 4, 2022

(54) FLUID SEALING DEVICE AND PRESSURE DETECTOR CALIBRATION DEVICE

(71) Applicant: FUJIKIN INCORPORATED, Osaka (JP)

(72) Inventors: Masahiko Takimoto, Osaka (JP); Masaaki Nagase, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 315 days.

(21) Appl. No.: 16/426,107

(22) Filed: May 30, 2019

(65) Prior Publication Data

US 2019/0368757 A1   Dec. 5, 2019

(30) Foreign Application Priority Data

May 31, 2018  (JP) .............................. JP2018-104671

(51) Int. Cl.
| | |
|---|---|
| *F24F 11/30* | (2018.01) |
| *F24F 11/72* | (2018.01) |
| *F24F 11/80* | (2018.01) |
| *G01L 27/00* | (2006.01) |
| *F16K 17/164* | (2006.01) |

(52) U.S. Cl.
CPC .............. *F24F 11/30* (2018.01); *F24F 11/72* (2018.01); *F24F 11/80* (2018.01); *G01L 27/00* (2013.01); *F16K 17/164* (2013.01)

(58) Field of Classification Search
CPC ....................................................... F24L 1/80
See application file for complete search history.

(56) References Cited

U.S. PATENT DOCUMENTS

| | | | | | |
|---|---|---|---|---|---|
| 5,816,285 | A | * | 10/1998 | Ohmi .................. | G05D 7/0635 137/487.5 |
| 6,289,923 | B1 | * | 9/2001 | Ohmi .................. | G05D 7/0635 137/486 |
| 2012/0298220 | A1 | * | 11/2012 | Hidaka ................ | G05D 7/0635 137/468 |

FOREIGN PATENT DOCUMENTS

JP          2018-025499 A     2/2018

* cited by examiner

*Primary Examiner* — Paul M. West
*Assistant Examiner* — Mark A Shabman
(74) *Attorney, Agent, or Firm* — Studebaker & Brackett PC (57) ABSTRACT

A fluid sealing device and a pressure detector calibration device are provided to enable further reducing of errors between a sealing pressure and a set pressure in a fluid flow path.
The fluid sealing device includes a pressure sealing structure having a fluid inlet, a fluid outlet, and a fluid flow path formed therein, a temperature controller, a temperature detector, a pressure detector, an inlet-side on-off valve, an outlet-side on-off valve, a restriction part, a fluid supply device, a fluid sealing controller for sealing the fluid in the pressure sealing structure by controlling the fluid supply device, the inlet-side on-off valve, and the outlet-side on-off valve, wherein the fluid sealing controller opens the outlet-side on-off valve after increasing the pressure in the fluid sealing structure to a primary pressure higher than the set pressure, and closes the outlet-side on-off valve when a value detected from the pressure detector becomes a corrected set pressure by an error correction value corresponding to a temperature detected by the temperature detector at the set pressure.

4 Claims, 6 Drawing Sheets

Set pressure of 200 Torr

| Trial | First time | | Second time | | | Third time | | |
|---|---|---|---|---|---|---|---|---|
| Sample | Sealing pressure (Torr) | Error (%) | Corrected set pressure (Torr) | Sealing pressure (Torr) | Error (%) | Corrected set pressure (Torr) | Sealing pressure (Torr) | Error (%) |
| 1 | 200.32 | 0.160 | 199.68 | 199.98 | -0.010 | - | - | - |
| 2 | 200.32 | 0.158 | 199.68 | 199.97 | -0.015 | - | - | - |
| 3 | 200.29 | 0.142 | 199.71 | 200.01 | 0.005 | - | - | - |
| 4 | 200.34 | 0.168 | 199.66 | 199.97 | -0.013 | - | - | - |
| 5 | 200.35 | 0.173 | 199.67 | 199.94 | -0.030 | 199.73 | 199.98 | -0.010 |
| 6 | 200.30 | 0.150 | 199.70 | 199.98 | -0.010 | - | - | - |
| 7 | 200.33 | 0.165 | 199.66 | 199.92 | -0.040 | 199.74 | 199.99 | -0.005 |
| 8 | 200.31 | 0.155 | 199.68 | 199.98 | -0.010 | - | - | - |
| 9 | 200.30 | 0.150 | 199.70 | 199.97 | -0.015 | - | - | - |
| 10 | 200.23 | 0.115 | 199.77 | 200.07 | 0.035 | 199.7 | 199.97 | -0.015 |

FLUID SEALING DEVICE AND PRESSURE DETECTOR CALIBRATION DEVICE

TECHNICAL FIELD

The present invention relates to a fluid pressure sealing device for sealing a fluid at a desired sealing pressure in a pressure sealing structure in which a fluid flow path is formed and a pressure detector calibration device for calibrating a pressure detector provided in the fluid flow path.

BACKGROUND ART

Conventionally, as a method of sealing a fluid at a desired sealing pressure in a pressure sealing structure in which a fluid flow path is formed, the following method has been applied. First, the downstream side of the fluid flow path is closed while the inside of the fluid flow path is maintained at a predetermined temperature by a heating device, a cooling device, or a temperature keeping device, and while the pressure of the fluid in the fluid flow path is measured by a pressure detector provided in the fluid flow path, the fluid is supplied from the upstream side of the fluid flow path, and when the fluid in the fluid flow path reaches a predetermined primary pressure higher than a desired sealing pressure, the upstream side of the fluid flow path is closed. Next, while measuring the pressure, the fluid in the fluid flow path is gradually discharged from the fluid flow path through a restriction part, thereby gradually reducing the pressure in the fluid flow path. When the inside of the fluid flow path reaches a desired sealing pressure, the discharge from the restriction part is stopped, and the inside of the fluid flow path is brought to the desired pressure. The reason why the fluid flow path is maintained at a predetermined temperature by the heating device, the cooling device, or the temperature keeping device is that the pressure detector has temperature dependence.

Conventionally, in order to calibrate the pressure detector provided in the fluid flow path, a precision pressure detector with higher accuracy than the pressure detector is prepared, and the pressure measurement in the conventional method is performed by the precision pressure detector instead of the pressure detector to adjust the inside of the fluid flow path to a desired sealing pressure, and the pressure detector is calibrated by comparing the detection value of the pressure detector with the detection value of the precision pressure detector. For example, a concentration measuring device (Patent Document 1 or the like) which is incorporated in a gas supply line for supplying a raw material gas to a semiconductor manufacturing equipment, and is configured to measure the concentration of the raw material gas flowing through the gas supply line, a pressure detector is provided in a gas flow path in a casing because the measured concentration has pressure dependence, and the pressure detector is calibrated.

CITATION LIST

Patent Literature

[Patent Document 1]
JPA-2018-025499

SUMMARY OF INVENTION

Technical Problem

However, in the above conventional method, although the sealing pressure in the fluid flow path is substantially the set pressure at the time of closing the discharge from the restriction part, after a while, the sealing pressure in the fluid flow path fluctuates slightly higher, an error between the sealing pressure and the set pressure increases, and the sealing could not be accurately performed with the desired pressure. This also occurs in the construction of the pressure detector of the concentration measuring device.

Accordingly, it is a primary object of the present invention to provide a fluid sealing device and a pressure detector calibration device to enable further reducing of an error between a sealing pressure and a set pressure in a fluid flow path.

Solution to Problem

As a result of intensive research, the present inventors have found that, as a main cause of the pressure increase in the fluid flow path after stopping the discharge from the restriction part in the above conventional method, when the fluid in the fluid flow path is gradually discharged through the restriction part and decompressed, the temperature of the fluid in the fluid flow path is lowered by adiabatic expansion, and when the fluid in the fluid flow path returns to a predetermined temperature after stopping the discharge from the restriction part, the pressure increases.

To achieve the above object, a first aspect of the present invention provides a fluid sealing device including a pressure sealing structure having a fluid inlet, a fluid outlet, and a fluid flow path formed therein, a temperature controller adjusting the pressure sealing structure to a predetermined temperature, a temperature detector detecting temperature in the pressure sealing structure, a pressure detector detecting pressure in the pressure sealing structure, an inlet-side on-off valve provided upstream of the fluid inlet, an outlet-side on-off valve provided downstream of the fluid outlet, a restriction part disposed upstream or downstream of the outlet-side on-off valve, a fluid supply device supplying a fluid to the fluid flow path through the fluid inlet, a fluid sealing controller controlling the fluid supply device, the inlet-side on-off valve, and the outlet-side on-off valve, and sealing the fluid in the pressure sealing structure, wherein the fluid sealing controller controls so as to open the outlet-side on-off valve after increasing the pressure in the pressure sealing structure to a primary pressure higher than a set pressure to seal the fluid, and close the outlet-side on-off valve when a value detected from the pressure detector reaches a corrected set pressure adjusted by an error correction value corresponding to a temperature detected by the temperature detector.

In a second aspect of the present invention, according to the fluid sealing device of the first aspect, it is preferable that the fluid sealing controller includes a storage device for storing an error correction value table according to the type of fluid to be introduced and the temperature in the pressure sealing structure.

A third aspect of the present invention is a pressure detector calibration device including a pressure sealing structure having a fluid inlet, a fluid outlet, and a fluid flow path formed therein, a thermostatic chamber for maintaining the pressure sealing structure at a predetermined temperature, a temperature detector for detecting temperature in the pressure sealing structure, a pressure detector for detecting pressure in the pressure sealing structure, an inlet-side on-off valve provided upstream of the fluid inlet, an outlet-side on-off valve provided downstream of the fluid outlet, a restriction part provided upstream or downstream of the outlet-side on-off valve, a precision pressure detector with higher accuracy than the pressure detector disposed between the inlet-side on-off valve and the fluid inlet, a fluid supply device for supplying a fluid to the fluid flow path through the fluid inlet, a fluid sealing controller for controlling the fluid supply device, the inlet-side on-off valve, and the outlet-side on-off valve, sealing the fluid in the pressure sealing structure, and calibrating a detection pressure from the pressure detector, wherein the fluid sealing controller controls so as to open the outlet-side on-off valve after increasing the pressure in the pressure sealing structure to a primary pressure higher than the set pressure to seal the fluid, close the outlet-side on-off valve when a value detected from the precision pressure detector reaches a corrected set pressure corrected by an error correction value corresponding to a temperature detected by the temperature detector, and calibrate a detection value of the pressure detector to be the set pressure.

In a fourth aspect of the present invention, according to the pressure detector calibration device of the third aspect, it is preferable that in the fluid sealing controller calibrates the pressure of the pressure detector at a plurality of temperatures on the basis of the detection values from the temperature detector.

Advantageous Effects of Invention

According to the present invention, errors between the sealing pressure and the target pressure can be minimized by presetting the amount of the pressure increase accompanying to the temperature increase caused by temperature recovery from temperature decrease due to pressure reduction as an error correction value, and adjusting the amount of the error correction value from the set pressure to seal the fluid.

DESCRIPTION OF EMBODIMENTS

First, an embodiment of a pressure detector calibration device according to the present invention will be described with reference to FIGS. 1 to 4.

Figure 1:
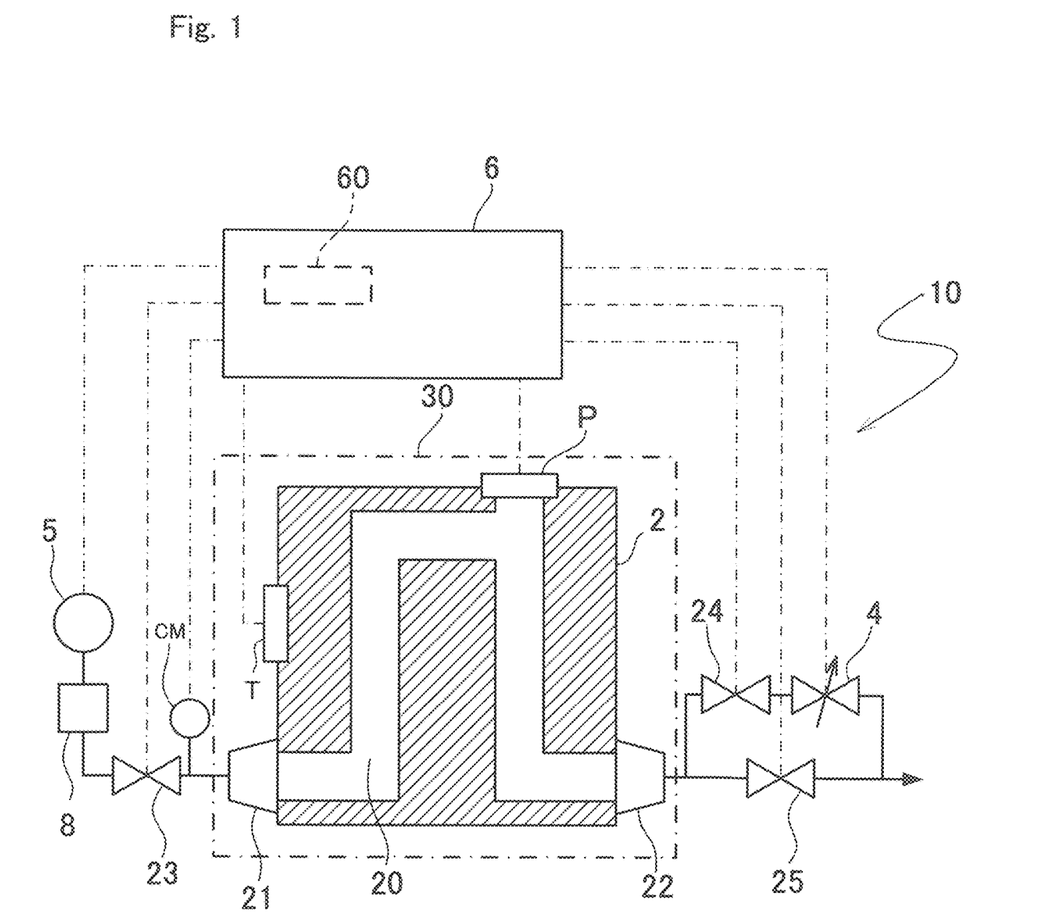
FIG. 1 is a block diagram showing an embodiment of a pressure detector calibration device according to the present invention.

As shown in FIG. 1, the pressure detector calibration device 10 includes a pressure sealing structure 2 having a fluid inlet 21, a fluid outlet 22, and a fluid flow path 20 formed therein; a thermostatic chamber 30 for maintaining the pressure sealing structure 2 at a predetermined temperature, a temperature detector T for detecting a temperature in the pressure sealing structure 2, a pressure detector P for detecting a pressure in the pressure sealing structure 2, an inlet-side on-off valve 23 provided upstream of the fluid inlet 21, an outlet-side on-off valve 24 provided downstream of the fluid outlet 22, a restriction part 4 provided upstream or downstream of the outlet-side on-off valve 24 (disposed downstream of the outlet-side on-off valve 24 in this embodiment), a precision pressure detector CM with higher accuracy than the pressure detector P disposed between the inlet-side on-off valve 23 and the fluid inlet 21, a fluid supply device 5 for supplying fluid to the fluid flow path 20 in the pressure sealing structure 2 through the fluid inlet 21, a fluid sealing controller 6 controlling the fluid supply device 5, the inlet-side on-off valve 23, and the outlet-side on-off valve 24, sealing the fluid in the pressure sealing structure 2, and calibrating the detection pressure from the pressure detector P. The on-off valve 25 disposed on the outlet-side is used when the fluid in the pressure sealing structure 2 is discharged without passing through the restriction part 4, and is kept in a closed state in the present embodiment. Reference numeral 8 in FIG. 1 denotes a pressure regulator or a pressure controller.

The restriction part 4 may be of a type capable of controlling the restriction part amount, for example, a proportionally controlled variable restriction part valve, or may be of a type requiring no control, for example, an orifice plate. In the illustrated example, a controllable restriction part 4 is illustrated.

The fluid sealing controller 6 controls so as to open the outlet-side on-off valve 24, after increasing the pressure in the pressure sealing structure 2 to a primary pressure higher than the set pressure to seal the fluid, and close the outlet-side on-off valve 24, when the value detected from the precision pressure detector CM reaches the corrected set pressure that is the set pressure corrected by the error correction value corresponding to the temperature detected by the temperature detector T, and calibrate the detection value of the pressure detector P to the set pressure.

Next, the procedure for obtaining the error correction value and the corrected set pressure will be described in detail with reference to the test data in the table of FIG. 2 in addition to FIG. 1. As a precondition of the calibration work, referring to FIG. 1, the thermostatic chamber 30 is set to a set temperature, and the pressure sealing structure 2 is maintained at the set temperature. In this test, the set temperature was set to a plurality of temperatures at intervals of 5° C. and 10° C. between 100° C. and 150° C. The temperature range to be set is not limited to this, and can be set in a wide range depending on the equipment requiring pressure sealing. For example, it is preferable to set the temperature in the range of 25° C. to 150° C. in a concentration measuring instrument, and 15° C. to 40° C. in a flow rate measuring device. Since the pressure detector P has temperature dependence, it is necessary to calibrate the pressure detector P at a plurality of temperatures while maintaining the temperature at a predetermined temperature. In this test, the pressure detector P was a semiconductor piezo resistive diffusion pressure sensor, and the precision pressure detector CM was a highly accurate capacitance manometer (Pressure detector for diaphragm type capacitance). The precision pressure detector CM is disposed on the outer side of the thermostatic chamber 30.

The thermostatic chamber 30 is set in this manner, and first, in the first trial (see FIG. 2), the outlet-side on-off valve 24 is closed, the inlet-side on-off valve 23 is opened to supply the fluid from the fluid supply device 5 into the fluid flow path 20, and when the detection pressure of the precision pressure detector CM reaches a primary pressure higher than the set pressure, the inlet-side on-off valve 23 is closed to seal the fluid flow path 20 at the primary pressure higher than the set pressure. In this test, 200 Torr was used. The primary pressure is not particularly limited, and is set to a pressure higher than the set pressure by about 10%. In this test, the set pressure is 200 Torr, and the primary pressure is 220 Torr. The primary pressure may be appropriately set, but may be, for example, within a range of 105~150% of the set pressure. Needless to say, the set pressures are not limited to these, and can be set in a wide range according to the applying equipment to be sealed in addition to 100 Torr, 25 Torr, and others.

Next, the outlet-side on-off valve 24 is opened, the fluid in the fluid flow path 20 is gradually discharged from the restriction part 4 to reduce the pressure in the fluid flow path 20, and the outlet-side on-off valve 24 is closed when the detection pressure of the precision pressure detector CM reaches the set pressure of 200 Torr. The precision pressure detector CM detects the pressure at predetermined time intervals, in this test every 10 milliseconds.

Figure 2:
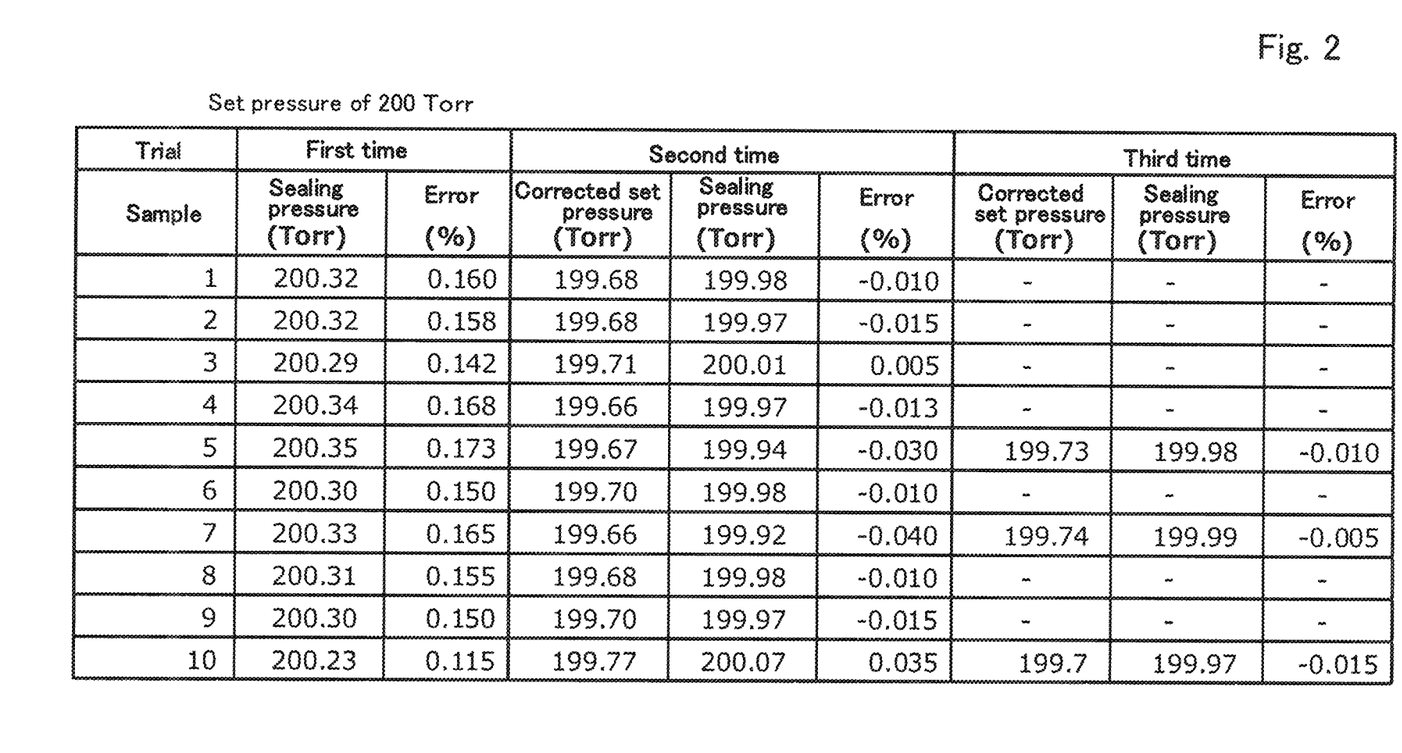
FIG. 2 is a table showing test data using a pressure detector calibration device according to the present invention.

The detection pressure of the precision pressure detector CM, after a predetermined period of time elapsed until the outlet-side on-off valve 24 was closed and the inside of the fluid flow path 20 was stabilized, was set as the sealing pressure for the first trial in the table of FIG. 2. The predetermined time (stabilization time) until the inside of the fluid flow path 20 is stabilized is not particularly limited, and may be a time until the temperature of the pressure sealing structure 2 decreases with a decrease in pressure (adiabatic expansion), more specifically, the temperature of the fluid flow path 20 returns to the temperature maintained in the thermostatic chamber 30. As shown in Table 2, it can be seen that the error between the sealing pressure of the first trial and the set pressure (200 Torr in this test) is 0.115%~0.173%.

The main cause of such error in the first trial is considered that when the fluid in the fluid flow path 2 gradually discharged and decompressed through the restriction part 4, the temperature of the fluid in the fluid flow path 20 decreases, when the fluid in the fluid flow passage 20 returns to the set temperature set by the thermostatic chamber 30 after stopping the discharge from the restriction part 4, the pressure increases. The first trial in the table of FIG. 2 is the same as the conventional sealing method.

Next, in a second trial, all of the on-off valves 21 and 24 are opened, and the fluid in the fluid flow path 20 is once discharged and reset. Then, the outlet-side on-off valve 24 is closed again, and the fluid is supplied from the fluid supply device 5 into the fluid flow path 20. Then, when the detection pressure of the precision pressure detector CM becomes a primary pressure higher than the set pressure, the inlet-side on-off valve 23 is closed. Thereby, the fluid flow path 20 is sealed at the primary pressure higher than the set pressure. Subsequently, the outlet-side on-off valve 24 is opened, and the fluid in the fluid flow path 20 is gradually discharged through the restriction part 4. As a result, the pressure in the fluid flow path 20 is reduced. Then, when the detection pressure of the precision pressure detector CM reaches a correction set pressure, which will be described later, the outlet-side on-off valve 24 is closed. Further, the detection pressure of the precision pressure detector CM, after a predetermined period of time has elapsed until the temperature in the fluid flow path 20 becomes stabilized, is detected as a sealing pressure. The sealing pressure is shown as the sealing pressure of the second trial in the table of FIG. 2. The predetermined time (stabilization time) is a time until the temperature of the fluid flow path 20 returns to the temperature maintained by the thermostatic chamber 30, as same as in the case of the first trial described above. From the table in FIG. 2, it can be seen that the error (sealing pressure-set pressure) of the sealing pressure in the second trial with respect to the set pressure of 200 Torr is between −0.040% and 0.035%.

Referring to the table of FIG. 2, when the detection pressure of the precision pressure detector CM reached the set pressure of 200 Torr in the first trial at the time of pressure reduction from the primary pressure, the outlet-side on-off valve 24 was closed. On the other hand, in the second trial, the error pressure (=sealing pressure−set pressure) between the set pressure and the sealing pressure in the first trial was set as an error correction value (first error correction value). Then, when the precision pressure detector CM detects a correction set pressure (the correction set pressure in the second trial shown in the table) obtained by subtracting the error correction value from the set pressure, the outlet-side on-off valve 24 is closed.

For example, in the first trial of Sample 1 in the table of FIG. 2, the sealing pressure is 200.32 Torr. The error pressure obtained by subtracting the set pressure of 200 Torr from the sealing pressure is +0.32 Torr. There is a positive error pressure relative to the set pressure. It is considered that this pressure increase is caused by the temperature increase from the temperature decrease at the time of pressure reduction described above. Therefore, the error pressure of 0.32 Torr was used as the error correction value (first error correction value) in sample 1 of the second trial. And then, pressure 199.68 Torr calculated by subtracting the error correction value 0.32 Torr from the set pressure 200 Torr was set as the corrected set pressure (first corrected set pressure). As a result, the sealing pressure becomes 199.98 Torr, and the error from the set pressure becomes −0.010%.

Furthermore, in a third trial, for samples 5, 7, and 10 which had relatively large errors in the second trial specifically, regarding the samples deviating from a reference error range (±0.025% in this test example), the error pressure obtained by subtracting the set pressure from the sealing pressure (first sealing pressure) in the second trial was used as an error correction value (second error correction value). Then, by subtracting the error correction value (second error correction value) from the first corrected set pressure, the third corrected set pressure (second corrected set pressure) in the third trial is set. For the sealing pressure of the third trial, it is found that the error from the set pressure of 200 Torr (sealing pressure minus set pressure) is −0.015%~−0.005%.

For example, in sample 5 of the third trial, the error pressure (second error pressure) obtained by subtracting the set pressure of 200 Torr from the first sealing pressure 199.94 Torr according to the first corrected set pressure is −0.06 Torr. Then, 199.73 Torr obtained by subtracting the error correction value (second error correction value), which is second error pressure (−0.06 Torr), from the first corrected set pressure (199.67 Torr), is set as the second corrected set pressure. Thereby, the sealing pressure in the third trial (second sealing pressure) trial becomes 199.98 Torr, the error between the set pressure of 200 Torr and the second sealing pressure becomes −0.010%. That is, in the sample 5 of the third trial, the first error correction value is subtracted from the set pressure 200 Torr, and the second error correction value is further subtracted to set the second corrected set pressure.

By setting the corrected set pressure as described above, the error between the set pressure and the sealing pressure is smaller than the conventional one (same as the first trial).

When the error between the set pressure and the sealing pressure deviates from the reference error range, a third error correction value, a third corrected set pressure, and further, a fourth error correction value, a fourth corrected set pressure, . . . can be calculated by increasing the number of trials by the same process as described above, so that the error becomes within the reference error range.

As described above, the error correction value is determined by a plurality of measurements, and fed back to obtain an optimum sealing pressure, or else, the temperature decrease due to adiabatic expansion can be calculated from the set temperature of the thermostatic chamber 30, the volume (surface area) of the fluid flow path 20, the value of the primary pressure higher than the set pressure, the pressure decrease speed (time) from the primary pressure, and the like. The pressure after a predetermined time has elapsed can also be calculated from the difference $\Delta T° C.$ between the calculated temperature and the set temperature, and the error correction value can be set on the basis of this value.

Figure 3:
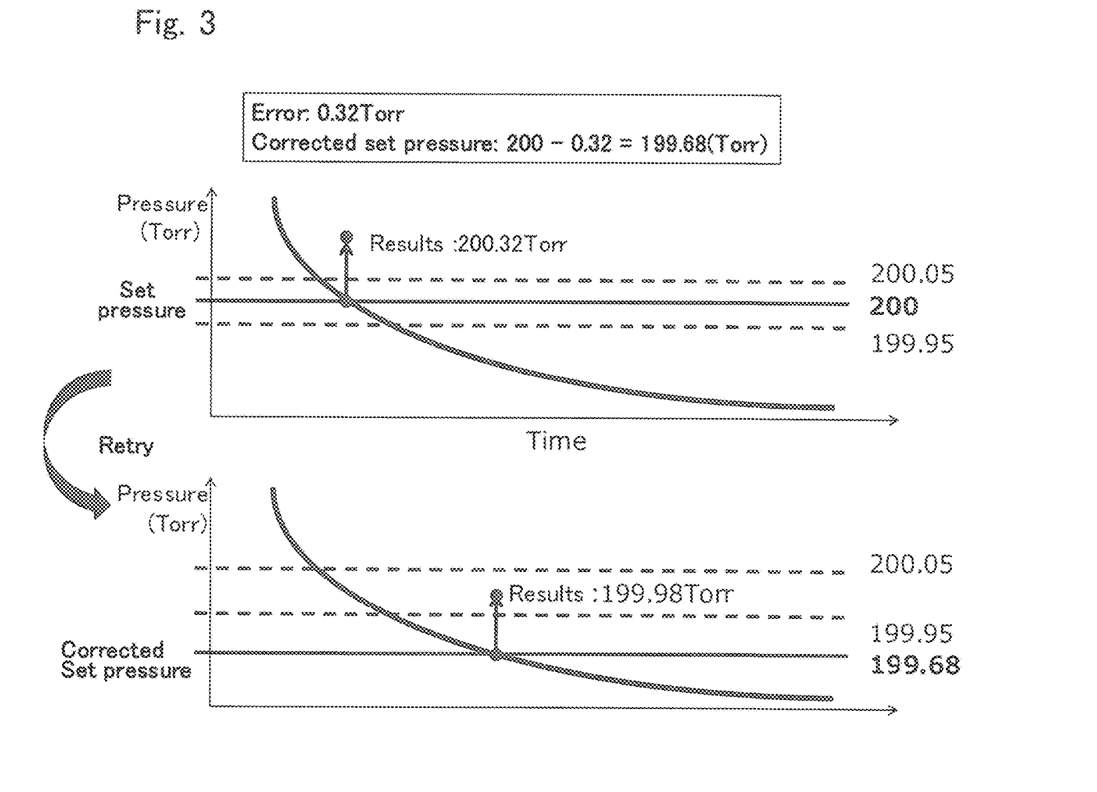
FIG. 3 is a graph illustrating a method for correcting a sealing pressure by a pressure detector calibration device according to the present invention.

FIG. 3 is a graph for explaining the process of calculating the error correction value. In the graph of FIG. 3, the set pressure is 200 Torr. In FIG. 3, when the fluid is discharged from the restriction part 4 and the pressure is reduced, the timing of closing the outlet-side on-off valve is 200 Torr in the upper graph, and the sealing pressure at this time is 200.32 Torr. On the other hand, in the lower graph, the sealing pressure at the time of closing is 199.98 Torr at the corrected set pressure of 199.98 Torr. The curve of the graph shows a state in which the fluid is discharged from the restriction part 4 and the pressure is reduced over time.

The fluid sealing controller 6 can sequentially calculate error correction values such as the first error correction value and the second error correction value by controlling the fluid supply device 5, and the opening-closing timings of the inlet-side on-off valve 23 and the outlet-side on-off valve 24. The fluid seal controller 6 may calculate only the first error correction value. Then, the fluid sealing controller 6 stores the calculated error correction value in a storage device 60, and can calculate the error correction value until the sealing pressure falls within the reference error range. In this manner, sealing by providing error correction values, enable the sealing pressure to be controlled within the range of ±0.025% in respect to the target value.

That is, the timing of closing the outlet-side on-off valve 24 when the fluid is discharged from the restriction part 4 and the reduced pressure is calculated as follows. For the first time, the first error correction value is calculated from the sealing pressure at the time of closing at the set pressure, and the first error correction value is stored. For the second time, to close at a first corrected set pressure calculated from the first error correction value. If the first sealing pressure at that time deviates from the reference error range, the second error correction value is calculated from the first corrected set pressure and the first sealing pressure in the third time. This is repeated until the sealing pressure falls within the reference error range. A program for executing the process of calculating the error correction value in this manner can be stored in the storage device 60 of the fluid sealing controller 6.

As a program for executing the process, for example, the above-mentioned set temperature of the thermostatic chamber 30, the volume (surface area) of the fluid flow path 20, the value of the primary pressure higher than the set pressure, the pressure decrease speed (time) from the primary pressure may be input or detected, and the error correction value may be determined in accordance with the corresponding set temperature and set pressure.

Figure 4:
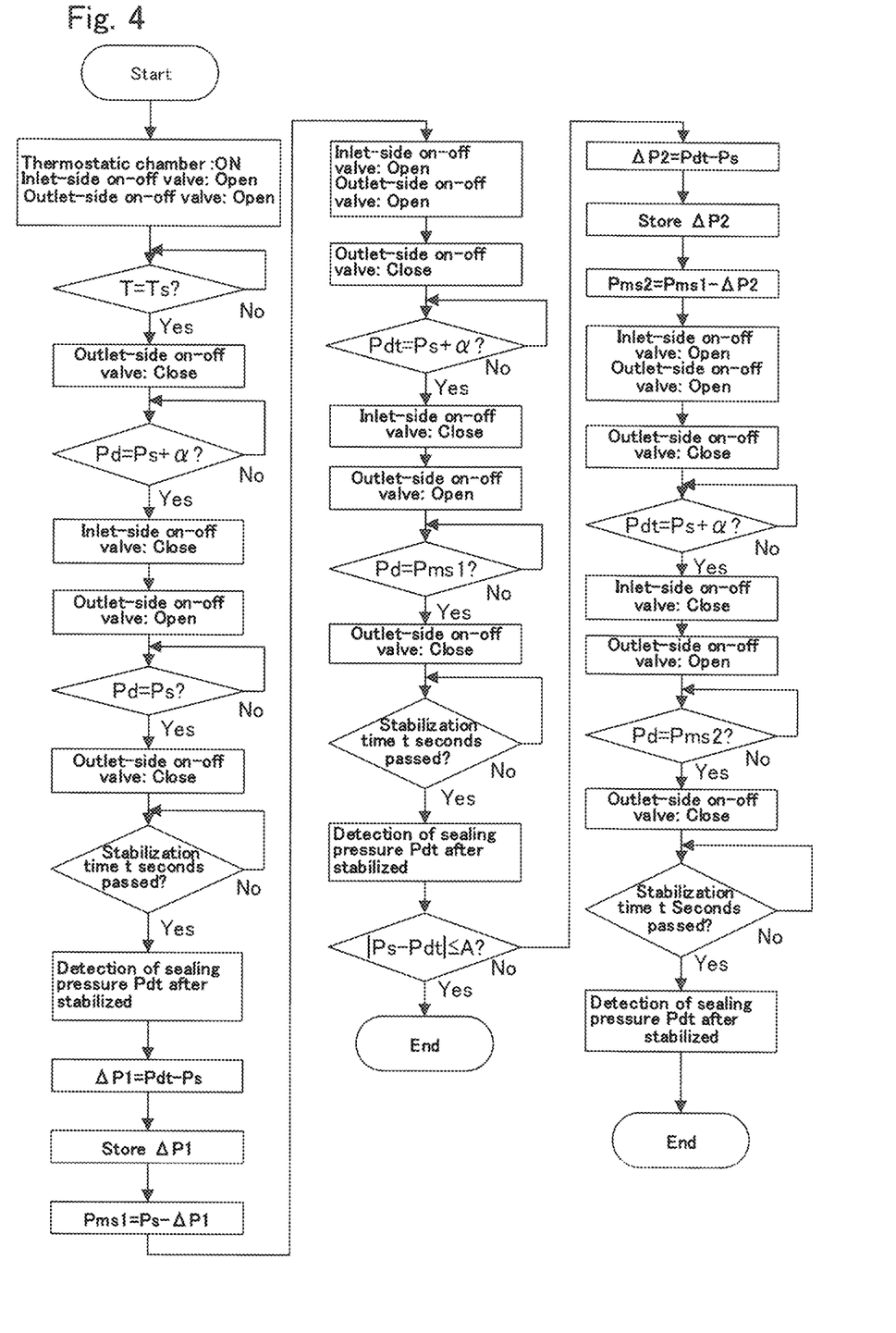
FIG. 4 is a flow chart illustrating a control flow using a pressure detector calibration device according to the present invention.

FIG. 4 is a flowchart showing an example of a processing procedure for calculating the error correction value and the correction set pressure by the fluid sealing controller 6. In the flow chart of FIG. 4, T is the detection temperature of the temperature detector T, Ts is the set temperature, Pd is the detection pressure of the precision pressure detector CM, Ps is the set pressure, Ps+α is the primary pressure, Pdt is the detection pressure of the precision pressure detector CM after a stabilization period oft seconds, and $\Delta P1$ is the error correction value (first error correction value), Pms1 is the corrected set pressure (first correction set pressure), A is the reference error range, $\Delta P2$ is the error correction value (second error correction value), and Pms2 is the corrected set pressure (second corrected set pressure). The flowchart of FIG. 4 illustrates the flow of the first to third trials shown in the table of FIG. 2, and when the sealing pressure of the third trial falls out of the reference error range, the flow of the fourth and subsequent trials can be added.

In this manner, the calibration accuracy of the pressure detector P is improved by making the error between the set pressure and the sealing pressure as small as possible, and calibrating the detection value of the pressure detector P to the set pressure. Calibration of the pressure detector P is performed in the fluid seal controller 6, and the output value of the pressure detector P is corrected to match the set pressure.

Since the pressure detector P has temperature dependence, the detection accuracy of the pressure detector P can be improved by setting the set temperature of the thermostatic chamber 30 to a plurality of temperatures and calibrating the pressure detector P at each set temperature. Therefore, the fluid seal controller 6 calibrates the pressure of the pressure detector P at a plurality of temperatures on the basis of the detection value from the temperature detector T, and the error correction value at the time of calibration is stored in the storage device 60. The storage device 60 is provided in the fluid sealing controller 6.

Since the temperature characteristic of the fluid varies depending on the type of the fluid, the pressure detector P is calibrated for each type of the fluid, and the error correction value at the time of calibration is stored in the storage device 60.

Figure 6:
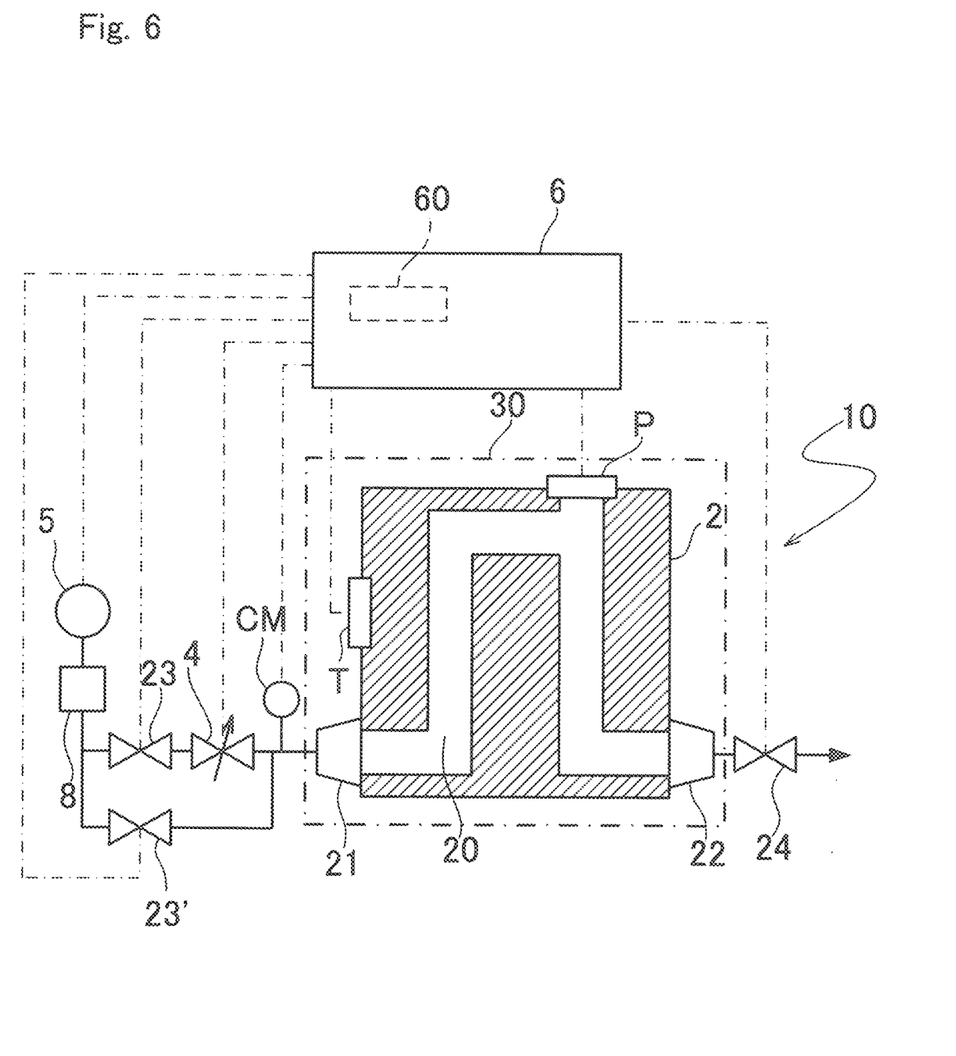
FIG. 6 is a block diagram showing another embodiment of a pressure detector calibration device according to the present invention.

In the present embodiment, an example is shown in which the fluid in the fluid flow path 20 is gradually discharged from the restriction part 4 after the pressure is set to a predetermined pressure higher than the set pressure, and then the pressure in the fluid flow path 20 is reduced, however, as shown in FIG. 6, it may be configured that the inlet-side on-off valves 23 and 23' are arranged in parallel, the restriction part 4 is provided upstream or downstream of the one inlet-side on-off valve 23 (downstream in the illustrated example), and a restriction part may not be disposed on the outlet-side on-off valve 24. In this case, the predetermined pressure is set lower than the set pressure, and when the predetermined pressure is reached, the outlet-side on-off valve 24 and the other inlet-side on-off valve 23' are closed, and the fluid is introduced into the fluid flow path 20 little by little from the predetermined pressure through the restriction part 4. Also in this case, when the corrected set pressure corrected by the error correction value is reached, the desired sealing pressure can be set by closing the one inlet-side on-off valve 23.

Next, an embodiment of a fluid sealing device according to the present invention will be described below with reference to FIG. 5. Components that are the same as or similar to those of the pressure detector calibration device shown in FIG. 1 are denoted by the same reference numerals, and a repetitive description thereof is omitted.

Figure 5:
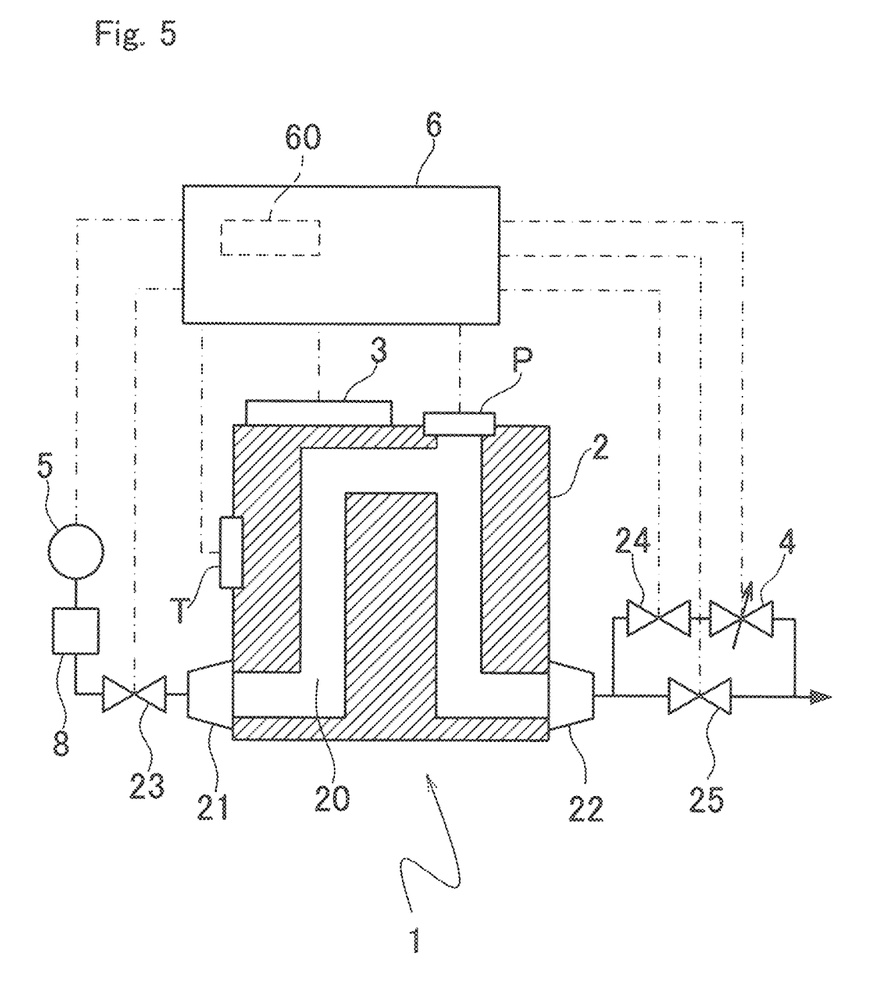
FIG. 5 is a block diagram showing an embodiment of a fluid sealing device according to the present invention.

Referring to FIG. 5, the fluid sealing device 1 includes a pressure sealing structure 2 having a fluid inlet 21, a fluid outlet 22, and a fluid flow path 20 formed therein, a temperature controller 3 for heating the pressure sealing structure 2 to a predetermined temperature, a temperature detector T for detecting temperature in the pressure sealing structure 2, a pressure detector P for detecting pressure in the pressure sealing structure 2, an inlet-side on-off valve 23 provided upstream of the fluid inlet 21, an outlet-side on-off valve 24 provided downstream of the fluid outlet 22, a restriction part 4 disposed downstream of the outlet-side on-off valve 24, a fluid supply device 5 for supplying a fluid to the fluid flow path 20 through the fluid inlet 21, and a fluid sealing controller 6 for controlling the fluid supply 5, the inlet-side on-off valve 23, and the outlet-side on-off valve 24, to seal the fluid in the pressure sealing structure 2.

As can be seen from FIG. 5, the fluid sealing device 1 is different from the pressure detector calibration device 10 illustrated in FIG. 1 in that it does not include a precision pressure detector CM of the pressure detector calibration device 10 illustrated in FIG. 1, and that it has a temperature controller 3 in place of the thermostatic chamber 30 of the pressure detector calibration device 10 illustrated in FIG. 1.

The fluid sealing controller 6 of the fluid sealing device 1 controls the temperature controller 3 to set the pressure sealing structure 2 to a predetermined set temperature by the temperature controller 3. The fluid sealing controller 6 detects the temperature of the pressure sealing structure 2 by the temperature detector T, and closes the outlet-side on-off valve 24 when the pressure sealing structure 2 is heated to a predetermined set temperature. Next, the fluid sealing controller 6 opens the inlet-side on-off valve 23 to supply the fluid from the fluid supply device 5 into the pressure sealing structure 2.

The fluid seal controller 6 of the fluid sealing device 1 monitors the output of the pressure detector P, and closes the inlet-side on-off valve 23 to seal the fluid when the pressure in the pressure sealing structure 2 increases to a primary pressure higher than the set pressure by the supply of the fluid into the pressure sealing structure 2.

Then, the fluid sealing controller 6 opens the outlet-side on-off valve 24, and gradually discharges the fluid in the pressure sealing structure 2 through the restriction part 4, so that the pressure in the pressure sealing structure 2 begins to depressurize.

The fluid sealing controller 6 detects a pressure decrease in the pressure sealing structure 2 by the pressure detector P every predetermined time interval, for example, every 10 milliseconds, and closes the outlet-side on-off valve 24 when the value detected from the pressure detector P reaches a corrected set pressure obtained by adding or subtracting an error correction value corresponding to the temperature detected by the temperature detector T to or from the set pressure.

The error correction value obtained by the pressure detector calibration device can be used as the error correction value, and an error correction value table corresponding to the pressure and the temperature can be stored in advance in the storage device 60 for each fluid type. The manner of addition or subtraction of the error correction value is the same as in the case of the pressure detector calibration device described above.

Alternatively, the fluid sealing controller 6 may execute a process program for obtaining error correction values, calculate and store error correction values corresponding to the pressure and temperature in the storage device 60, in the same manner as described in the above pressure detector calibration device.

When the temperature of the fluid decreased by the discharge of the fluid from the restriction part 4 returns to the set temperature by the heating action of the temperature controller 3, as can be seen from the embodiment of the pressure detector calibration device described above, the pressure in the pressure sealing structure 2 has a small error between the set pressure and the sealing pressure, and the fluid can be sealed at a sealing pressure closer to the set pressure.

The present invention is not to be construed as being limited to the above-mentioned embodiments, and various modifications can be made without departing from the spirit of the present invention.

REFERENCE SIGNS LIST

1 Fluid sealing device
2 Pressure sealing structure
3 Temperature controller
4 Restriction part
5 Fluid supply device
6 Fluid sealing controller
10 Pressure detector calibration device
20 Fluid-flow path
21 Fluid inlet
22 Fluid outlet
23, 23' Inlet-side on-off valve
24 Outlet-side on-off valve
60 Storage device
CM Precision pressure detector
P Pressure detector
T Pressure detector

The invention claimed is:
1. A fluid sealing device comprising:
a pressure sealing structure having a fluid inlet, a fluid outlet, and a fluid flow path formed therein;
a temperature controller for adjusting the pressure sealing structure to a predetermined temperature;
a temperature detector for detecting temperature in the pressure sealing structure;
a pressure detector for detecting pressure in the pressure sealing structure;
an inlet-side on-off valve provided upstream of the fluid inlet;
an outlet-side on-off valve provided downstream of the fluid outlet;
a restriction part disposed upstream or downstream of the outlet-side on-off valve;
a fluid supply device for supplying a fluid to the fluid flow path through the fluid inlet;
a fluid sealing controller for controlling the fluid supply device, the inlet-side on-off valve, and the outlet-side on-off valve to seal the fluid in the pressure sealing structure, wherein
the fluid sealing controller comprises a storage device and is configured to, according to a program stored in the storage device, control so as to open the outlet-side on-off valve after increasing the pressure in the pressure sealing structure to a primary pressure higher than a set pressure to seal the fluid, and close the outlet-side on-off valve when a value detected from the pressure detector reaches a corrected set pressure corrected by an error correction value corresponding to a temperature detected by the temperature detector.

2. The fluid sealing device according to claim 1, wherein the storage device stores an error correction value table depending on the type of fluid to be introduced and the temperature in the pressure sealing structure.

3. A pressure detector calibration device comprising:
a pressure sealing structure having a fluid inlet, a fluid outlet, and a fluid flow path formed therein;
a thermostatic chamber for maintaining the pressure sealing structure at a predetermined temperature;
a temperature detector for detecting temperature in the pressure sealing structure;
a pressure detector for detecting pressure in the pressure sealing structure;
an inlet-side on-off valve provided upstream of the fluid inlet;
an outlet-side on-off valve provided downstream of the fluid outlet;
a restriction part disposed upstream or downstream of the outlet-side on-off valve;
a precision pressure detector with higher accuracy than the pressure detector disposed between the inlet-side on-off valve and the fluid inlet;
a fluid supply device for supplying a fluid to the fluid flow path through the fluid inlet;
a fluid sealing controller for controlling the fluid supply device, the inlet-side on-off valve, and the outlet-side on-off valve, sealing the fluid in the pressure sealing structure, and calibrating a detection pressure of the pressure detector, wherein
the fluid sealing controller comprises a storage device and is configured to, according to a program stored in the storage device, control so as to open the outlet-side on-off valve after increasing the pressure in the pressure sealing structure to a primary pressure higher than a set pressure to seal the fluid, and close the outlet-side on-off valve when a value detected from the precision pressure detector reaches a corrected set pressure corrected by an error correction value corresponding to a temperature detected by the temperature detector, and calibrate a detection value of the pressure detector to a set pressure.

4. The pressure detector calibration device according to claim 3, wherein the fluid seal controller calibrates the pressure of the pressure detector at a plurality of temperatures on the basis of detection values from the temperature detector.

* * * * *